(12) United States Patent
Strömberg et al.

(10) Patent No.: US 7,244,332 B2
(45) Date of Patent: Jul. 17, 2007

(54) SMART LABEL WEB AND A METHOD FOR ITS MANUFACTURE

(75) Inventors: Samuli Strömberg, Tampere (FI); Marko Hanhikorpi, Pirkkala (FI)

(73) Assignee: Rafsec Oy (FI)

( * ) Notice: Subject to any disclaimer, the term of this patent is extended or adjusted under 35 U.S.C. 154(b) by 291 days.

(21) Appl. No.: 10/444,692

(22) Filed: May 23, 2003

(65) Prior Publication Data

US 2004/0004295 A1    Jan. 8, 2004

Related U.S. Application Data

(63) Continuation of application No. PCT/FI01/01038, filed on Nov. 29, 2001.

(30) Foreign Application Priority Data

Dec. 11, 2000    (FI) .................................. 20002707

(51) Int. Cl.
B32B 37/12    (2006.01)
(52) U.S. Cl. ...................... 156/301; 156/302; 156/303; 340/568.7
(58) Field of Classification Search ................ 156/261, 156/256, 301, 302, 303; 340/568.7
See application file for complete search history.

(56) References Cited

U.S. PATENT DOCUMENTS

| | | |
|---|---|---|
| 3,628,977 A | 12/1971 | Deegan et al. |
| 3,897,964 A | 8/1975 | Oke et al. |
| 4,021,705 A | 5/1977 | Lichtblau |
| 4,253,899 A | 3/1981 | Takemoto et al. |
| 4,288,499 A | 9/1981 | Kielbania, Jr. |
| 4,303,949 A | 12/1981 | Peronnet |
| 4,419,413 A | 12/1983 | Ebihara |
| 4,443,491 A | 4/1984 | McIntyre |
| 4,450,024 A | 5/1984 | Haghiri-Tehrani et al. |
| 4,455,359 A | 6/1984 | Patzold et al. |
| 4,686,152 A | 8/1987 | Matsubayashi et al. |
| 4,841,712 A | 6/1989 | Roou |
| 4,846,922 A | 7/1989 | Benge et al. |
| 4,866,505 A | 9/1989 | Roberts et al. |
| 4,897,534 A * | 1/1990 | Haghiri-Tehrani .......... 235/488 |
| 4,954,814 A | 9/1990 | Benge |

(Continued)

FOREIGN PATENT DOCUMENTS

DE    19511300    10/1996

(Continued)

*Primary Examiner*—Richard Crispino
*Assistant Examiner*—Christopher T. Schatz
(74) *Attorney, Agent, or Firm*—Fitch, Even, Tabin & Flannery

(57) ABSTRACT

The Invention relates to a method for the manufacture of a smart label web. The smart label web comprises smart labels placed one after another and/or side by side and comprising a circuitry pattern and an integrated circuit on a chip therein. In the method, an electrical contact is formed between the integrated circuit on a chip and the circuitry pattern of the smart label in the smart label web in such a way that a structural part separated from a separate carrier web and comprising an integrated circuit on a chip is attached to the smart label. The structural part contains a thermoplastic material whereby it is attached to the smart label.

14 Claims, 5 Drawing Sheets

U.S. PATENT DOCUMENTS

| | | | |
|---|---|---|---|
| 4,977,006 A | 12/1990 | Smith et al. | |
| 5,026,452 A | 6/1991 | Kodai | |
| 5,172,461 A | 12/1992 | Pichl | |
| 5,201,976 A | 4/1993 | Eastin | |
| 5,244,836 A | 9/1993 | Lim | |
| 5,250,341 A | 10/1993 | Kobayashi et al. | |
| 5,266,355 A | 11/1993 | Wernberg et al. | |
| 5,294,290 A | 3/1994 | Reeb | |
| 5,302,431 A | 4/1994 | Schultz | |
| 5,309,326 A | 5/1994 | Minoru | |
| 5,337,063 A | 8/1994 | Takahira | |
| 5,344,808 A | 9/1994 | Watanabe et al. | |
| 5,384,955 A | 1/1995 | Booth et al. | |
| 5,525,400 A | 6/1996 | Manser et al. | |
| 5,528,222 A | 6/1996 | Moskowitz et al. | |
| 5,534,372 A | 7/1996 | Koshizuka et al. | |
| 5,598,032 A | 1/1997 | Fidalgo | |
| 5,667,541 A | 9/1997 | Klun et al. | |
| 5,689,263 A | 11/1997 | Dames | |
| 5,690,773 A | 11/1997 | Fidalgo et al. | |
| 5,714,305 A | 2/1998 | Teng et al. | |
| 5,759,683 A | 6/1998 | Boswell | |
| 5,781,110 A | 7/1998 | Habeger, Jr. et al. | |
| 5,810,959 A | 9/1998 | Tanaka et al. | |
| 5,822,194 A | 10/1998 | Horiba et al. | |
| 5,837,367 A | 11/1998 | Ortiz, Jr. et al. | |
| 5,850,690 A | 12/1998 | Launay et al. | |
| 5,852,289 A | 12/1998 | Masahiko | |
| 5,867,102 A | 2/1999 | Souder et al. | |
| 5,918,113 A | 6/1999 | Higashi et al. | |
| 5,918,363 A | 7/1999 | George et al. | |
| 5,920,290 A | 7/1999 | McDonough et al. | |
| 5,932,301 A | 8/1999 | Kamiyama et al. | |
| 5,935,497 A | 8/1999 | Rose | |
| 5,936,847 A | 8/1999 | Kazle | |
| 5,937,512 A | 8/1999 | Lake et al. | |
| 5,952,713 A | 9/1999 | Takahira et al. | |
| 5,962,840 A | 10/1999 | Haghiri-Tehrani et al. | |
| 5,963,134 A | 10/1999 | Bowers et al. | |
| 5,969,951 A | 10/1999 | Fischer et al. | |
| 5,973,600 A | 10/1999 | Mosher, Jr. | |
| 5,976,690 A | 11/1999 | Williams et al. | |
| 5,982,284 A | 11/1999 | Baldwin et al. | |
| 5,994,263 A | 11/1999 | Ohshima et al. | |
| 6,012,641 A | 1/2000 | Watada | |
| 6,025,780 A | 2/2000 | Bowers et al. | |
| 6,040,630 A | 3/2000 | Panchou et al. | |
| 6,066,377 A | 5/2000 | Tonyali et al. | |
| 6,066,378 A | 5/2000 | Morii et al. | |
| 6,070,803 A | 6/2000 | Stobbe | |
| 6,077,382 A | 6/2000 | Watanabe | |
| 6,090,484 A | 7/2000 | Bergerson | |
| 6,107,920 A * | 8/2000 | Eberhardt et al. | 340/572.7 |
| 6,113,728 A | 9/2000 | Tsukagoshi et al. | |
| 6,147,662 A | 11/2000 | Grabau et al. | |
| 6,161,761 A | 12/2000 | Ghaem et al. | |
| 6,177,859 B1 | 1/2001 | Tuttle et al. | |
| 6,180,256 B1 | 1/2001 | Sargeant | |
| 6,204,764 B1 | 3/2001 | Maloney | |
| 6,206,292 B1 | 3/2001 | Robertz et al. | |
| 6,220,516 B1 | 4/2001 | Tuttle et al. | |
| 6,232,870 B1 | 5/2001 | Garber et al. | |
| 6,248,199 B1 * | 6/2001 | Smulson | 156/244.12 |
| 6,249,199 B1 | 6/2001 | Liu | |
| 6,259,408 B1 | 7/2001 | Brady | |
| 6,288,905 B1 | 9/2001 | Chung | |
| 6,293,470 B1 | 9/2001 | Asplund | |
| 6,315,856 B1 | 11/2001 | Asagiri et al. | |
| 6,325,294 B2 | 12/2001 | Tuttle et al. | |
| 6,330,162 B2 | 12/2001 | Sakamoto et al. | |
| 6,353,420 B1 | 3/2002 | Chung | |
| 6,358,588 B1 | 3/2002 | Edwards et al. | |
| 6,365,546 B1 | 4/2002 | Kometani | |
| 6,371,378 B1 | 4/2002 | Brunet et al. | |
| 6,376,769 B1 | 4/2002 | Chung | |
| 6,404,643 B1 | 6/2002 | Chung | |
| 6,412,470 B1 | 7/2002 | Denz | |
| 6,412,702 B1 | 7/2002 | Ishikawa et al. | |
| 6,421,013 B1 | 7/2002 | Chung | |
| 6,432,235 B1 | 8/2002 | Bleckmann et al. | |
| 6,446,874 B1 | 9/2002 | Elbaz et al. | |
| 6,451,154 B1 * | 9/2002 | Grabau et al. | 156/300 |
| 6,478,229 B1 | 11/2002 | Epstein | |
| 6,480,110 B2 | 11/2002 | Lee et al. | |
| 6,497,371 B2 | 12/2002 | Kayanakis et al. | |
| 6,520,544 B1 | 2/2003 | Mitchell et al. | |
| 6,522,549 B2 | 2/2003 | Kano et al. | |
| 6,540,865 B1 | 4/2003 | Miekka et al. | |
| 6,555,213 B1 | 4/2003 | Koneripalli et al. | |
| 6,557,766 B1 | 5/2003 | Leighton | |
| 6,569,280 B1 | 5/2003 | Mehta et al. | |
| 6,595,426 B1 | 7/2003 | Brunet et al. | |
| 6,600,418 B2 | 7/2003 | Francis et al. | |
| 6,607,834 B2 | 8/2003 | Davis et al. | |
| 6,609,728 B1 | 8/2003 | Voerman et al. | |
| 6,644,551 B2 | 11/2003 | Clayman et al. | |
| 6,694,872 B1 | 2/2004 | LaBelle et al. | |
| 6,736,918 B1 | 5/2004 | Ichikawa et al. | |
| 6,780,668 B1 | 8/2004 | Tsukahara et al. | |
| 6,843,422 B2 | 1/2005 | Jones et al. | |
| 6,853,286 B2 | 2/2005 | Nikawa et al. | |
| 2005/0087607 A1 * | 4/2005 | Stromberg | 235/492 |

FOREIGN PATENT DOCUMENTS

| | | |
|---|---|---|
| DE | 19530823 | 2/1997 |
| DE | 196 34 473 | 1/1998 |
| DE | 19733800 | 2/1999 |
| DE | 19737565 | 3/1999 |
| DE | 197 58 057 | 5/1999 |
| DE | 19915765 | 10/2000 |
| EP | 0 227 293 | 7/1987 |
| EP | 0 249 266 | 12/1987 |
| EP | 0 545 910 | 12/1988 |
| EP | 0575631 | 12/1993 |
| EP | 0 625 832 | 4/1994 |
| EP | 0 620 091 | 10/1994 |
| EP | 717 371 | 12/1995 |
| EP | 0692770 | 1/1996 |
| EP | 0704816 | 4/1996 |
| EP | 0706152 | 4/1996 |
| EP | 0730254 | 9/1996 |
| EP | 0737935 | 10/1996 |
| EP | 0788159 | 8/1997 |
| EP | 0 824 270 | 2/1998 |
| EP | 0 824 270 A2 | 2/1998 |
| EP | 0870627 | 10/1998 |
| EP | 0922555 | 6/1999 |
| EP | 0 991 014 | 4/2000 |
| EP | 1 014 302 A1 | 6/2000 |
| EP | 1 130 542 | 9/2001 |
| EP | 1132859 | 9/2001 |
| EP | 1172761 | 1/2002 |
| EP | 1225538 | 7/2002 |
| FI | 20001345 | 7/2003 |
| FI | 20002707 | 1/2004 |
| FR | 2 744 270 | 8/1997 |
| FR | 2780534 | 12/1999 |
| FR | 2 782 821 | 3/2000 |
| GB | 2279612 | 1/1995 |
| GB | 2 294 899 | 5/1996 |
| JP | 61268416 | 11/1986 |
| JP | 2141094 | 5/1990 |
| JP | 5155191 | 6/1993 |

| | | |
|---|---|---|
| JP | 05169843 | 7/1993 |
| JP | 5279841 | 10/1993 |
| JP | 09197965 | 7/1997 |
| JP | 11221986 | 8/1999 |
| JP | 2000048153 | 2/2000 |
| JP | 2000057287 | 2/2000 |
| JP | 2000113147 | 4/2000 |
| JP | 200021588 | 8/2000 |
| JP | 2000235635 | 8/2000 |
| JP | 2000242740 | 9/2000 |
| JP | 200118040 | 4/2001 |
| JP | 2002140672 | 5/2002 |
| WO | WO 93/01571 | 1/1993 |
| WO | WO 97/14112 | 4/1997 |
| WO | WO 98/44195 | 10/1998 |
| WO | WO 98/49652 | 11/1998 |
| WO | WO 99/08245 | 2/1999 |
| WO | WO 99/24934 | 5/1999 |
| WO | WO 99/40760 | 8/1999 |
| WO | WO 99/48071 | 9/1999 |
| WO | WO 00/45353 | 8/2000 |
| WO | WO 01/16878 | 3/2001 |
| WO | WO 01/85451 | 11/2001 |
| WO | WO 02/49093 | 6/2002 |
| WO | WO 02/082368 | 10/2002 |

* cited by examiner

SMART LABEL WEB AND A METHOD FOR ITS MANUFACTURE

This is a continuation of prior application Ser. No. PCT/FI01/01038 filed on Nov. 29, 2001, designating the United States, which is hereby incorporated by reference in its entirety.

FIELD

The present invention relates to methods for manufacturing a smart label web and a carrier web, and a smart label web, and a component for a smart label in a smart label web. A smart label web comprises smart labels placed one after the other and/or next to each other and comprising a circuitry pattern and an integrated circuit on a chip therein. In the method for manufacturing a smart label web, an electrical contact is formed between an integrated circuit on a chip and a circuitry pattern of a smart label in a smart label web in such a way that a component separated from a separate carrier web and comprising an integrated circuit on a chip is attached to the smart label.

BACKGROUND

For attaching an integrated circuit on a chip in such a way that it is in electrical contact with a circuitry pattern, methods are known for direct attachment of the chip by flip-chip technology. Alternatively, the chip can be attached in such a way that a separate structural part, onto whose surface the chip is attached, is connected to the smart label.

A method is known from the publication U.S. Pat. No. 5,810,959, in which a substrate and a silicon chip are attached by means of an anisotropic conductive thermosetting adhesive by using heat and pressure.

Publication U.S. Pat. No. 5,918,113 discloses a method, in which an anisotropic conductive adhesive is applied onto a circuit board. The adhesive contains a thermoplastic or thermosetting resin and conductive powder dispersed therein. The adhesive layer is softened, and a semiconductor chip is adhered to it on application of heat and pressure.

From the publication U.S. Pat. No. 5,918,363, a method is known in which integrated circuits formed on a wafer are tested to determine whether they are functional. An underfill is applied on the functional integrated circuits, and the chips are separated from each other. The underfill can contain a thermoplastic substance. After this, the silicon chips are connected to their location of use in such a way that the underfill is spread around the electric connections.

From the publication U.S. Pat. No. 5,936,847, an electronic circuit is known in which there is a non-conductive polymer layer forming an underfill between a substrate and a chip. The polymer layer is provided with openings for electrical contacts. The substrate is also provided with openings, through which a conductive polymer is injected to form an electrical contact between the substrate and the chip.

The publication U.S. Pat. No. 6,040,630 discloses a connection for a chip which can also be disconnected, if necessary. On a substrate having a circuitry pattern formed on the substrate, a thermoplastic film is positioned, the film exposing the bumps of the chip. The thermoplastic film forms an underfill for the chip, and when the film is heated, it connects the chip and the circuitry pattern.

A method is known from the publication U.S. Pat. No. 6,077,382, in which an anisotropic conductive thermosetting adhesive is placed on a circuit board, and the circuit board is heated to a temperature which is lower than the setting temperature of the adhesive. A semiconductor chip is placed in its position and attached by means of heat and pressure.

Methods based on flip-chip technology have for example the following disadvantages:
- the production line is complicated, expensive and inconvenient in view of further development, because all the operations are integrated on the same line, and
- the placement of the chip on the smart label requires that the tool used has a long path and also that the chip is positioned very precisely in the correct location.

The smart label can also be provided with a separate structural part comprising an integrated circuit on a chip, attached on a film material.

The electrical contact between the integrated circuit on the chip and the circuitry pattern of the smart label is formed so that the film material of the separate structural part is impregnated with a conductive layer which is connected to the chip and which layer is brought into contact with the circuitry pattern in connection with the manufacture of the smart label by connecting both ends of the strip-like structural part to the circuitry pattern. That is, the structural part is off the smart label in the area between its ends. The structural part is attached to that side of the smart label on whose opposite side the circuit pattern is located so that the chip comes against the smart label.

The above-mentioned methods involve for example the following problems:
- the techniques of attaching the structural part are unsophisticated and complex,
- the materials presently used require long processing times, for which reason a significant difference is not achieved in the production rate when compared with flip-chip technology,
- due to the slow processes, lines for single process steps become relatively complex and expensive,
- the mechanical techniques for connecting the structural parts, such as crimp connections, restrict the material choices and may also cause problems of reliability,
- in some existing smart labels, the distance between the structural part and the circuitry pattern and simultaneously the distance between the integrated circuit on the chip and the circuitry pattern are changed by bending, because the structural part is not wholly attached to the smart label, wherein the stray capacitance affecting the frequency of the electrical oscillating circuit is changed, and
- the smart label has a relatively thick construction, which is disadvantageous in further processing steps.

SUMMARY

By means of the methods and the smart label web and the structural part according to the invention, it is possible to reduce the above-mentioned problems. The method of the invention for the manufacture of a smart label web is characterized in that the structural part comprises a thermoplastic material by which it is attached to the smart label.

The method of the invention for the manufacture of a carrier web is characterized in that the carrier web comprises a thermoplastic material onto whose surface the integrated circuit on the chip is attached.

The smart label web according to the invention is characterized in that the structural part comprises a thermoplastic material by which it is attached to the smart label.

The structural part according to the invention is characterized in that it comprises a thermoplastic material by which it can be attached to the smart label.

The use of thermoplastic materials provides e.g. the following advantages:
thermoplastic materials can be repeatedly formed by applying heat,
a time-consuming chemical process which is typical of thermosetting materials will not be needed, but a fast attachment can be made,
the materials are relatively easy to tailor and are relatively inexpensive in large batches, and
processing temperatures lower than those for thermosetting materials are possible.

The use of a separate structural part provides e.g. the following advantages:
the process of attachment of the chip is independent of the size and geometry of the circuitry pattern,
the picking up of a chip from a wafer and its placement on a carrier web is a simple and fast process, because only a short path is required of the turning tool,
as the structural part is small in size, it can contain materials which are more expensive but have better properties, such as more thermoresistant materials or materials with better dimension stability, and
the attachment of the structural part to the smart label can be made with greater tolerances than the direct attachment of the chip to the circuitry pattern of the smart label.

The method according to the invention provides e.g. the following advantages:
efficient and reliable production,
sufficient reliability and strength of the product,
minimum fixed and variable costs per smart label web,
flexible production technology, and
remaining development potential.

In the present application, smart labels refer to labels comprising an RF-ID circuit (identification) or an RF-EAS circuit (electronic article surveillance). A smart label web consists of a sequence of successive and/or adjacent smart labels. The smart label can be manufactured by pressing the circuitry pattern with an electroconductive printing ink on a film, by etching the circuitry pattern on a metal film, by punching the circuitry pattern from a metal film, or by winding the circuit pattern of for example copper wire. The electrically operating RFID (radio frequency identification) circuit of the smart label is a simple electric oscillating circuit (RCL circuit) operating at a determined frequency. The circuit consists of a coil, a capacitor and an integrated circuit on a chip. The integrated circuit comprises an escort memory and an RF part which is arranged to communicate with a reader device. Also the capacitor of the RCL circuit can be integrated in the chip. The smart label web is of a material that is flexible but still has a suitable rigidity, such as polycarbonate, polyolefine, polyester, polyethylene terephtalate (PET), polyvinyl chloride (PVC), or acrylonitrile/butadiene styrene copolymer (ABS).

The wafer is normally supplied for use in attaching processes so that the chips are separated from each other, on a carrying film supported by a frame. The single chips are detached in the process by pushing the chip mechanically from underneath the Carrying film and by gripping it from the opposite side with a die bonder or die sorter utilizing an underpressure suction.

Thermoplastic materials refer to materials which can be formed by applying heat. As raw material, the thermoplastic film can be in fluid form or as a film; preferably, it is a film.

Thermoplastic films refer to films whose surface can be made adherent to another surface by the effect of heat, but which are substantially non-adherent at room temperature. Thermoplastic films can also be heated several times without substantially affecting the adherence.

The thermoplastic film can be a thermoplastic anisotropic conductive film (AFC) or a non-conductive film (NCF). When a thermoplastic film is used, there is no need for an underfill, because the thermoplastic film forms a sufficiently flexible backing for the chip. When a non-conductive thermoplastic film is used, the reliability of the electric contact is slightly lower than in the case of an anisotropic conductive film, but it is still sufficient. Substantially the same process conditions can be used for both anisotropic conducting and non-conducting thermoplastic films. As an example to be mentioned, thermoplastic films include anisotropic conductive films 8773 and 8783 (Z-Axis Adhesive Films 8773 and 8783) by 3M. The films contain conductive particles in such a way that they are electroconductive in the thickness direction of the film only. There is no conductivity in the direction of the plane of the film. The thermoplastic film can be made fluid by means of heat and pressure. When cooled, the thermoplastic film is crystallized and gives the bond mechanical strength. Curing by heat will not be necessary. The thermoplastic film can be of a polymer such as polyester or polyether amide. The conductive particles, having a size of typically 7 to 50 μm, can be a particulate such as glass particles coated with silver. The thickness of the thermoplastic film is typically 20 to 70 μm. The thermoplastic film is normally formed on the surface of a release paper or the like. The release paper can be released from the film in connection with or after the heating of the film.

In the method according to the invention, a carrier web is first manufactured. It comprises a base web and thermoplastic material on the surface of the base web. The base web can be of the same material as the smart label web. The surface of the base web is provided with a conductive metal coating for electrical contacts of structural parts. A thermoplastic material is attached to that side of the base web which has the conductive metal coatings for electrical contacts of the structural parts. Integrated circuits on chips are attached one after another and/or next to each other on the surface of the thermoplastic material, which is preferably a thermoplastic film, by using flip-chip technology. Because the dimensions of the structural part to be formed of the carrier web are small, it is possible to place chips relatively close to each other on the carrier web. Hence, long paths will not be needed for attaching the chip. With short paths, it is possible to implement sufficiently accurate positioning more easily than on attachment of the chip directly to the circuitry pattern and the position of the chip may vary within a larger range.

The thermoplastic film is normally laminated on the base web by means of heat and/or pressure. The chips are picked up from the silicon wafer by means of a die sorter and placed in a continuous manner onto the surface of the thermoplastic film. When the chip is placed in its position, the web containing the base web and the thermoplastic film is heated on the opposite side so that the chip is tacked lightly to the web before making the final bond. It is also possible that the thermoplastic film is in a sufficiently tacky form after the lamination, wherein the bond of the chip can be made without simultaneous heating. After an initial bond formulation, the final bond of the chip is made by applying heat and/or pressure. At the same time, a release paper web can be laminated onto the surface of the thermoplastic film, but this is not always necessary. The final bond of the chip can be made by means of heat and/or pressure for example by a thermal resistor or a series of thermal resistors or in a nip formed by two rolls, where at least one of the contact surfaces forming the nip is heated and at least one is resilient.

In addition to the above-mentioned nip, a nip can also be formed between a shoe roll and its counter roll. The thermoplastic film can also be heated by microwaves. The film can be heated selectively while simultaneously applying pressure on the bond (materials blended with selective additives are heated in a microwave field).

In the next step, structural parts consisting of an integrated circuit on a chip are separated from a carrier web, and the structural parts are attached to the circuitry pattern of a smart label in a web containing smart labels. The structural part is attached to that side of the smart label on which the circuitry pattern is provided. This is done in a way that the thermoplastic film and the chip are in contact with the smart label and the side of the base web is left as the outer surface of the structural part. The structural part is substantially fully attached to the smart label and a reliable bond is achieved. When making the bond, that part of the smart label in the smart label web is heated to which the structural part is attached. Alternatively, the structural part is heated and the surfaces of the smart label and structural part are made to adhere to each other. The final bond of the structural part is made by applying heat and/or pressure under similar process conditions as making the bond with the chip. Simultaneously with the attachment of the structural part, it is possible either to laminate, on both sides of the smart label web, the other web layers simultaneously onto the structure, or to leave out the layers and to use the nip to achieve an attachment only. To provide a more reliable lamination result or a more rigid structure, it is also possible to start cross-linking of an adhesive layer upon combining several web layers simultaneously.

Using an anisotropic conductive thermoplastic material as the thermoplastic material of the structural part, it is possible to isolate the anisotropic conductive material of the structural part and the circuitry pattern of the smart label from each other. This avoids the risk of short circuiting. This is possible in the following ways:

a dielectric is pressed onto the surface of the circuitry pattern of the smart label at the location where the structural part will be later attached, an insulating film is laminated onto the surface of the structural part, at a suitable location, or the anisotropic conductive material is tailored for example in film form so that conductive particles are only found at the point where they are needed for making an electrical contact.

The manufacture of the carrier web and the manufacture of the smart label web can take place in the same process or they can be separate processes.

BRIEF DESCRIPTION OF THE DRAWINGS

In the following, the invention will be described with reference to the appended drawings, in which.

DETAILED DESCRIPTION

Figure 1:
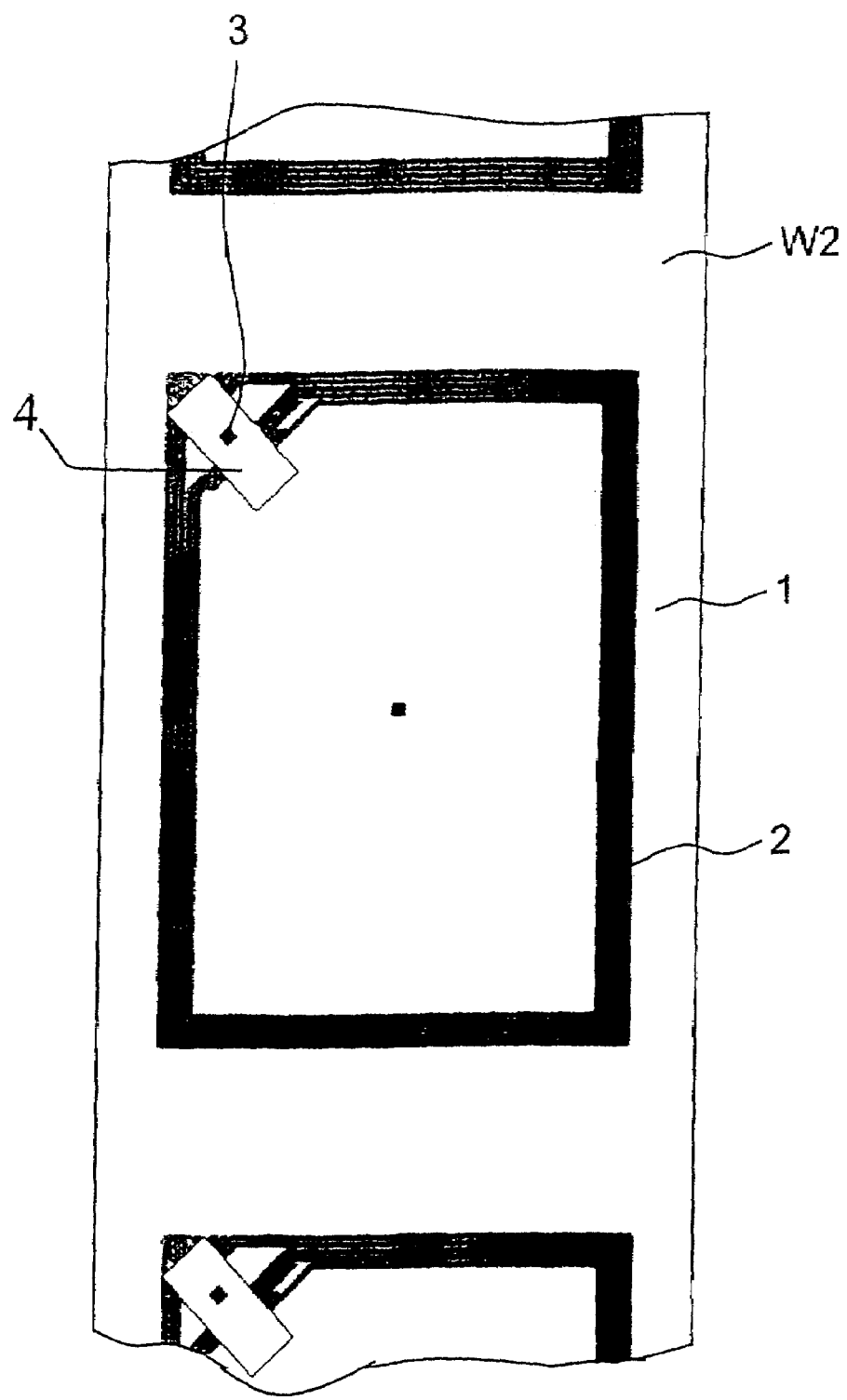
FIG. 1 shows a smart label web according to the invention in a top view.

FIG. 1 shows a smart label web W2 according to the invention, containing single smart labels 1 one after another in a continuous sequence. The smart label 1 contains a circuitry pattern 2 and an integrated circuit 3 on a chip, attached to the surface of a separate structural part 4. An electrical contact is formed between the circuitry pattern 2 and the integrated circuit 3 on the chip. The structural part 4 comprises a base web 4b, a thermoplastic film 4a and an integrated circuit 3 on a chip (shown in FIG. 3), attached to the surface of the thermoplastic film. The structural part 4 is attached to the smart label 1 in such a way that substantially the whole area of its one side is attached to the smart label 1 by means of a thermoplastic film. The integrated circuit on the chip 3 is left between the smart label 1 and its connection substrate. The thermoplastic film can be an anisotropic electroconductive film or a non-conductive film. If a non-conductive film 15 is used, either the structural part 4 and/or the circuitry pattern 2 of the smart label must be provided with bumps for providing an electrical contact. The bumps can be provided before the lamination of the thermoplastic film on the same production line on which the chip is attached to the base web W1 in such a way that suitable bumps, whose material can be a suitable metal, are formed at the ends of the structural part 4. Preferably, so-called stud bumps are formed at this process step by means of a gold wire bonder.

Figure 2A:
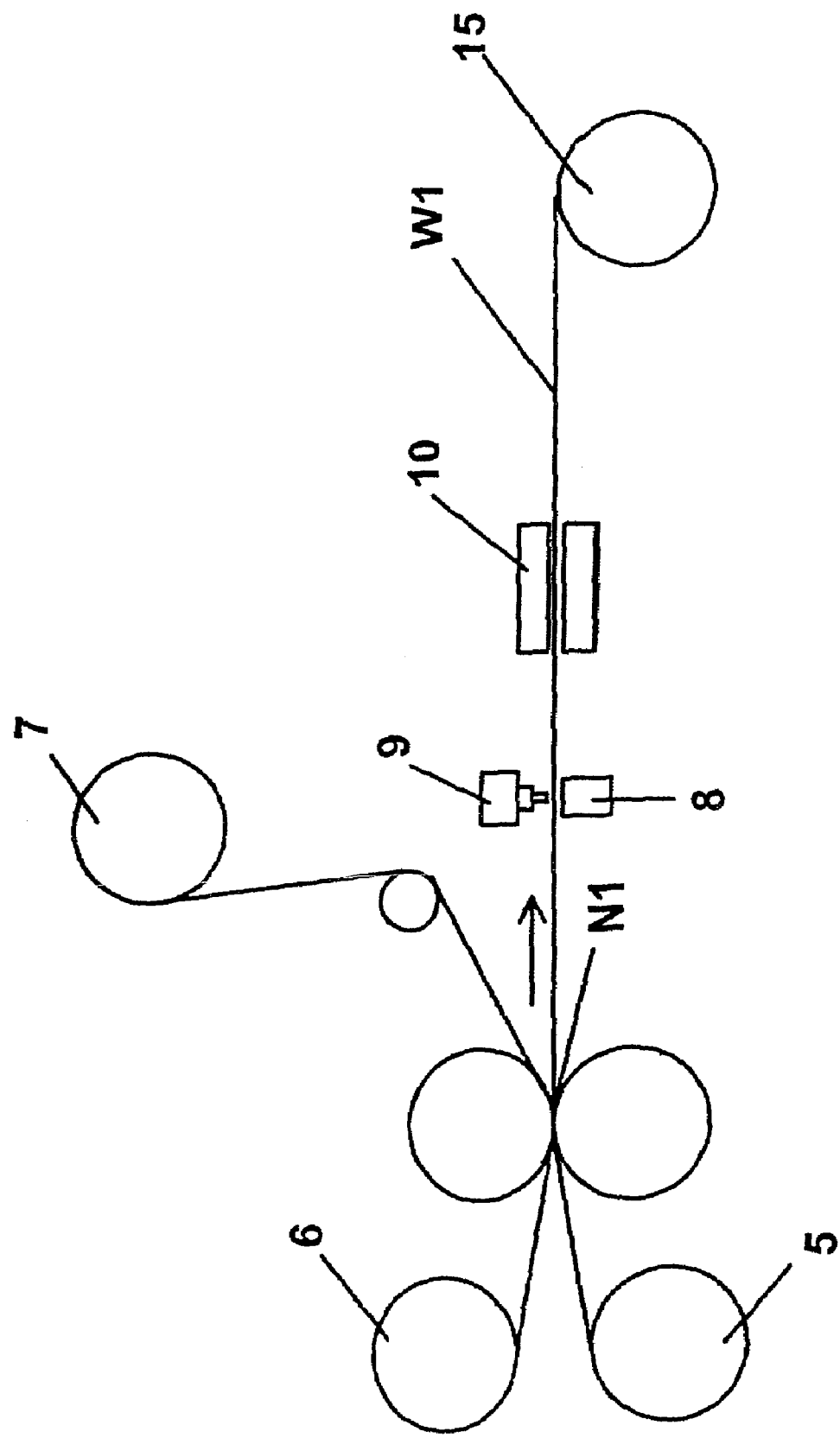
FIGS. 2 to 3 show some processes of the invention for the manufacture of a smart label web.
Figure 2B:
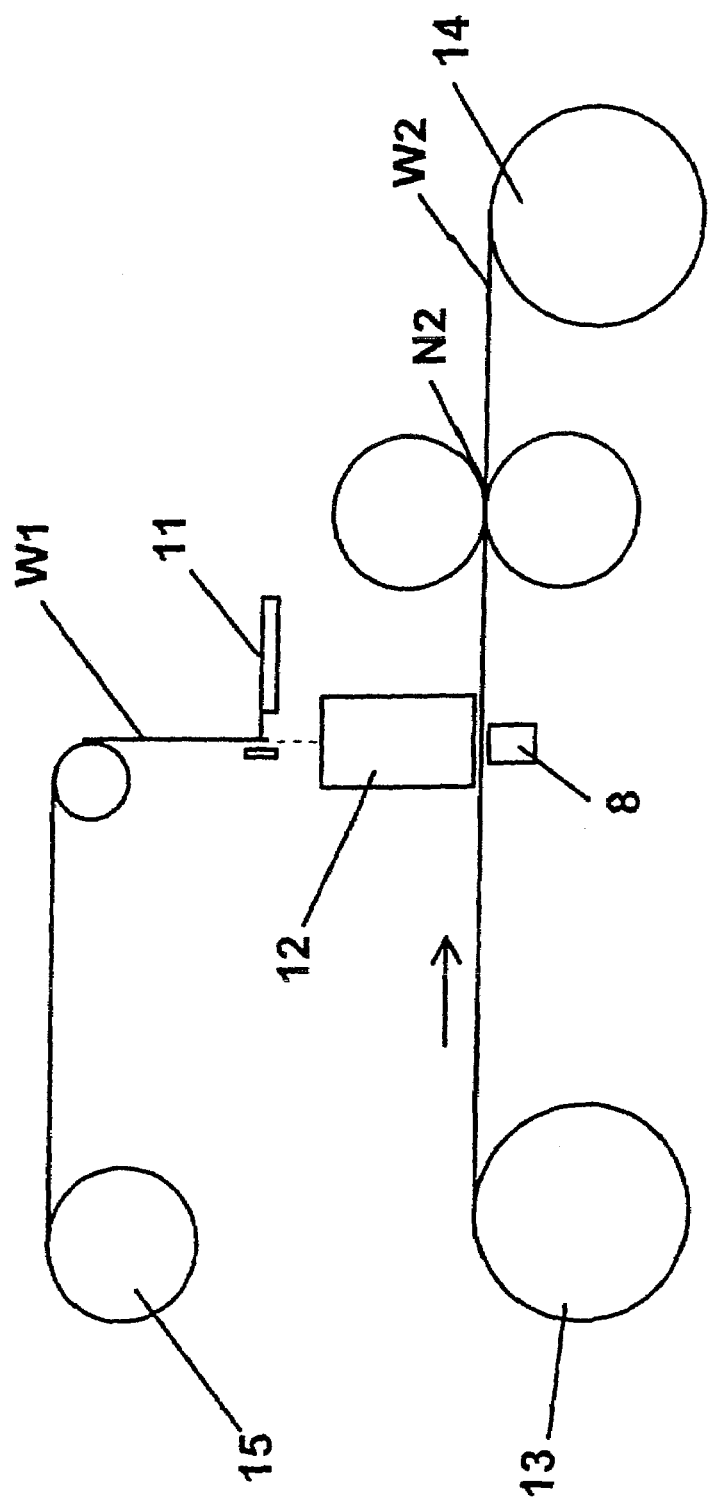
Figure 3:
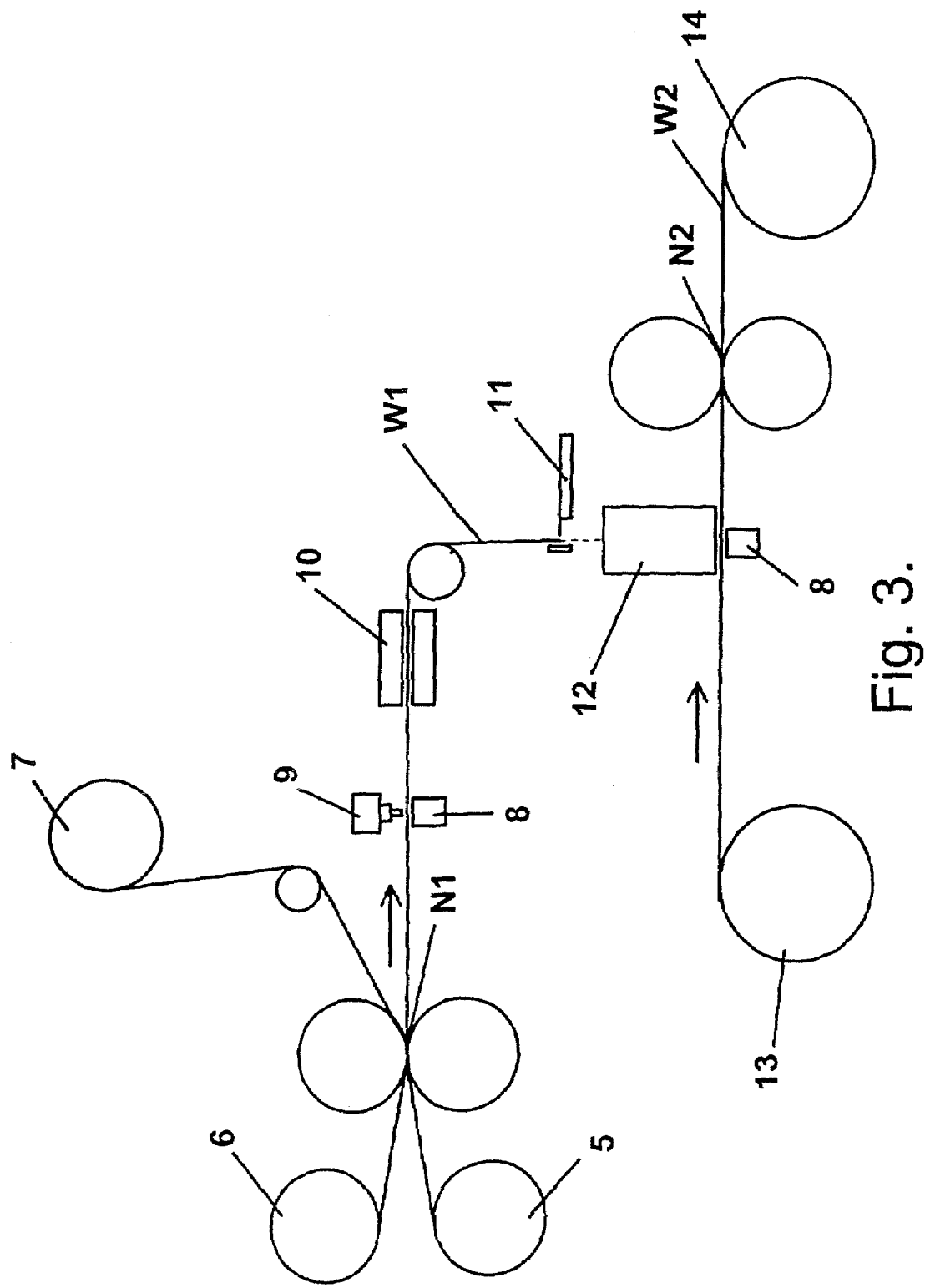

FIGS. 2a, 2b and 3 show some processes for manufacturing a smart label web. FIGS. 2a and 2b show a situation in which the carrier web W1 is first manufactured separately in a process shown in FIG. 2a. The smart label web W2 is then manufactured in a process shown in FIG. 2b. FIG. 3, in turn, shows a process integrating the manufacture of the base web W1 and the smart label web W2.

In the processes of FIGS. 2a and 3, the base web of the carrier web W1 is unwound from a reel 5 and the thermoplastic film is unwound from a reel 6. The thermoplastic film can be an anisotropic electroconductive film (AFC) or a non-conductive film (NCF). The base web and the thermoplastic film are combined in a nip N1 where at least one of the two contact surfaces is heated. The release paper web of the thermoplastic film is reeled up on a roll 7.

From the wafer that is separated into single chips, a single chip is picked up which is placed onto the web consisting of the base web and the thermoplastic film by means of a fixing tool 9. Typically, the rate of picking up a chip from a wafer is about 200 ms. At the same time, the web is heated with a heater 8 at the location where the chip is placed, but on the opposite side of the web. The heating of the web causes that the thermoplastic film becomes tacky and the chip can thus be attached. The thermoplastic film is preferably heated to a temperature of 80 to 105° C.

The final bond of the integrated circuit 3 on the chip is made by means of a thermal resistor or a series of thermal resistors 10. Thus, the thermoplastic film is preferably heated to a temperature of 140 to 150° C. Alternatively, the carrier web W1 can be led to a nip where at least one of the two contact surfaces is heated. The nip is preferably a nip longer than a nip formed by hard rolls. The nip can be, for example, a nip N1 formed by a thermoroll and a resilient roll. The pressure per unit area is lower than in a corresponding hard nip. One of the contact surfaces forming the nip can also be a shoe roll. It is also possible that the heating takes place before the nip, wherein the thermoplastic film between the circuitry pattern of the smart label and the integrated circuit on the chip is heated for example by microwaves. The thermoplastic film is thus blended with additives which are heated by microwaves. After the heating by microwaves, the carrier web W1, onto which the integrated circuit on the chip is placed, is introduced to a process step where pressure is exerted on the joint surface. It is also possible that the heating by microwaves and the application of pressure on the joint surface take place simultaneously.

The force which is exerted to the joint is preferably 200 to 800 g per joint, irrespective of which of the above-mentioned methods for exerting pressure on the joint is used for making the final bond of the chip. Typically, the process time required for making the bond is about 2 seconds. As the dimension of a single structural part is 10 to 20 mm, the processing length should be about 200 mm to avoid restricting the cycle time of 200 ms which is taken by picking up a chip from the wafer and placing it in its position on the surface of the thermoplastic film.

It is also possible to include in the processes of FIG. 2a or 3 the lamination of the structural part 4 with a thin dielectric film (not shown in the figures). In this circumstance, the thin film is used as a dielectric between the circuitry pattern 2 and the chip 3. At the location where the electrical contact is provided, the film can be removed for example by punching.

The finished carrier web W1 is reeled up on a roll 15 (FIG. 2a) and moved on to the next process (FIG. 2b) or led further in the process (FIG. 3). In the process of FIG. 2b, the roll 15 is unwound. The carrier web W1 is separated by a cutter 11 into single structural parts 4. The web containing smart labels 1 is unwound from the reel 13. A dispenser 12 places the structural parts 4 in a focused manner onto the surface of the smart label 1 of the web containing smart labels. The structural parts 4 can also be readily separated on the surface of the carrier film. The dispensers 12 are known as such. A dispenser for dispensing structural parts 4 from a carrier web W1 is known e.g. from special and security printing machines in which security bands, holograms or foils are supplied. On the other hand, if the structural parts 4 are separated on the surface of the carrier film, it is possible to apply a technology that is known e.g. from the dispensing of labels.

The web that is unwound from the roll 13 is heated simultaneously when the dispenser 12 places the structural part 4 onto the smart label 1. If the thermoplastic film used is a non-conductive thermoplastic film, the structural part 4 or the circuitry pattern of the smart label must be provided with bumps for providing an electrical contact between the chip and the circuitry pattern. If there are several smart labels 1 next to each other, preferably each parallel sequence of smart labels should be provided with a separate dispenser. The thermoplastic film 4a of the structural part 4 adheres to the smart label 1, and the integrated circuit on the chip 3 is left between the smart label 1 and the thermoplastic film 4a. The final bond of the structural part 4 is made in a nip N2. The nip N2 can be a single nip, as shown in the figure, or it can be a series of nips. Preferably, at least one of the two contact surfaces forming the nip is heated, and at least one is resilient. The finished smart label web W2 is reeled up on a reel 14.

Figure 4:
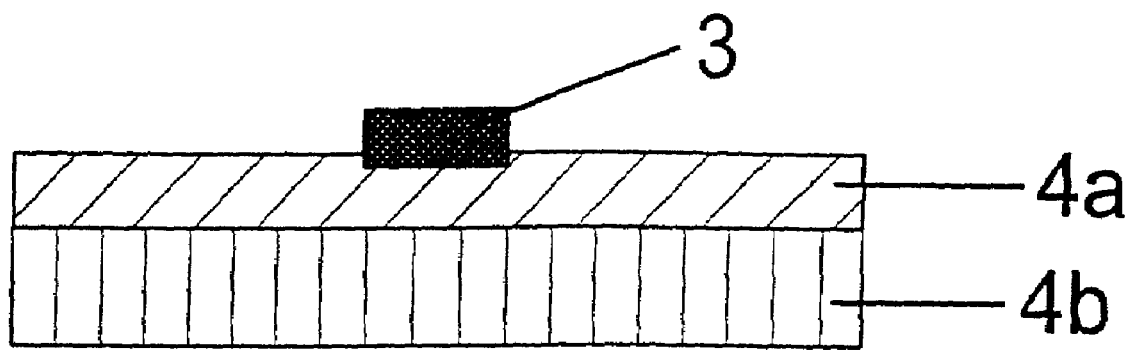
FIG. 4 illustrates the structure of the structural part in a cross section.

FIG. 4 shows the cross-section of the structural part 4. The structural 5 part comprises an integrated circuit on a chip 3, a thermoplastic film 4a, and a layer 4b consisting of the base web. On the surface where the thermoplastic film 4a is attached, the layer 4b is provided with the conductive metal coating of the structural part.

The above-described facts do not restrict the invention, but the invention may vary within the scope of the claims.

The manufacture of the carrier web and the manufacture of the smart label web can take place in the same process or they can be separate processes. The process of manufacture of the smart label web can be continued so that the other layers to be joined to the surface of the smart label web are attached in the same process, even so that the attachment is made simultaneously with the final bond of the structural part. It is also possible that the chip is only tacked lightly to the carrier web and the final bond of the chip is not made until the step in which the structural part is finally attached to the smart label. The process thus becomes simpler and more reliable, because the chip will not be subjected to e.g. heating, pressure or bending several times. The thermoplastic material is not necessarily in the form of a film but it can be, as a raw material before application on the web, for example in fluid form. The main idea of the present invention is that an integrated circuit on a chip can be attached to a smart label in a simple and reliable manner as a part of a separate structural part.

The invention claimed is:

1. A method for the manufacture of a smart label web which comprises smart labels one after another, the smart labels comprising a circuitry pattern and an integrated circuit on a chip attached to the circuitry pattern, the method comprising:
   providing a thermoplastic anisotropic conductive film;
   providing a base web which has at least one side with a conductive coating for electrical contact;
   laminating the thermoplastic anisotropic conductive film to the conductive coating on the base web to provide a multilayered film;
   affixing the chip with the integrated circuit on the thermoplastic anisotropic conductive film by heating the film and pressing the chip onto the heated film to provide a structural part web;
   cutting the structural part web into individual structural parts;
   providing a label web which comprises labels one after the other, the labels including at least one circuitry pattern;
   placing a structural part which has been cut from the structural part web onto a label on the label web so that the thermoplastic film overlies the chip and the chip lies between the thermoplastic film and the label to provide a laminate; and
   heating the laminate to affix the structural part to the label and to provide an electrical connection between the chip and the circuitry pattern and to provide a smart label web.

2. The method according to claim 1, wherein the method further comprises subjecting the laminate to pressure during the heating to affix the structural part to the smart label.

3. The method according to claim 2, wherein the laminate is subjected heat and pressure either simultaneously or in successive steps.

4. A method for the manufacture of a smart label web which comprises smart labels one after another, the smart labels comprising a circuitry pattern and an integrated circuit on a chip attached to the circuitry pattern, the method comprising:
   laminating a thermoplastic anisotropic conductive film and a polymeric base web film to provide a carrier web with at least two layers which include a base web layer laminated with a thermoplastic conductive film layer, the base web including electrically conductive contacts which include an electrically conductive coating;

placing the chip onto the surface of the conductive thermoplastic film layer;

affixing the chip with the integrated circuit on the thermoplastic anisotropic conductive film layer by heating the film and pressing the chip onto the heated film to provide a structural part web;

cutting the structural part web into individual structural parts;

providing a label web which comprises labels one after the other, the labels including at least one circuitry pattern;

placing a structural part which has been cut from the structural part web onto a label on the label web so that the thermoplastic film overlies the chip and the chip lies between the thermoplastic film and the label to provide a laminate; and heating the laminate to affix the structural part to the label with the thermoplastic conductive film layer so that substantially all of the surface of the conductive thermoplastic film layer is attached to the label and to provide an electrical connection between the chip and the circuitry pattern and to provide a smart label web.

5. The method according to claim 4 wherein the laminate and structural part label are heated under pressure which pressure is formed in a nip which has at least one resilient contact surface.

6. The method according to claim 4 wherein the laminate and structural part label are heated under pressure which pressure is formed in a nip which has at least one resilient contact surface.

7. The method according to claim 4 wherein the label web is selected from the group consisting of polycarbonate, polyolefin, polyester, polyethylene terephthalate, polyvinyl chloride, and acrylonitrile/butadiene/styrene copolymer.

8. The method according to claim 4 wherein the thermoplastic film is selected from the group consisting of polyester, polyether amide and mixtures thereof.

9. The method according to claim 4 wherein polymeric base web film is selected from the group consisting of polycarbonate, polyolefin, polyester, polyethylene terephthalate, polyvinyl chloride, and acrylonitrile/butadiene/styrene copolymer.

10. A method for the manufacture of a smart label web which comprises smart labels one after another, the smart labels comprising a circuitry pattern and an integrated circuit on a chip attached to the circuitry pattern, the method comprising:

laminating a non-conductive thermoplastic film and a polymeric base web film to provide a carrier web with at least two layers which include a base web layer laminated onto the thermoplastic film layer, the base web film including electrically conductive contacts which include an electrically conductive coating;

affixing the chip with the integrated circuit on the thermoplastic film by heating the film and pressing the chip onto the heated film to provide a structural part web;

cutting the structural part web into individual structural parts;

providing a label web which comprises labels one after the other, the labels including at least one circuitry pattern;

placing a structural part which has been cut from the structural part web onto a label on the label web so that the thermoplastic film overlies the chip and the chip lies between the thermoplastic film and the label to provide a laminate; and heating the laminate to affix the structural part to the label with the thermoplastic film layer so that substantially all of the surface of the non-conductive thermoplastic film layer is attached to the label and to provide an electrical connection between bumps on the structural part or on the label.

11. The method according to claim 10 wherein the laminate and structural part label are heated under pressure which pressure is formed in a nip which has at least one resilient contact surface.

12. The method according to claim 10 wherein the label web is selected from the group consisting of polycarbonate, polyolefin, polyester, polyethylene terephthalate, polyvinyl chloride, and acrylonitrile/butadiene/styrene copolymer.

13. The method according to claim 10 wherein the thermoplastic film is selected from the group consisting of polyester, polyether amide and mixtures thereof.

14. The method according to claim 10 wherein polymeric base web film is selected from the group consisting of polycarbonate, polyolefin, polyester, polyethylene terephthalate, polyvinyl chloride, and acrylonitrile/butadiene/styrene copolymer.

* * * * *